United States Patent [19]

Ishikawa et al.

[11] Patent Number: 5,068,537

[45] Date of Patent: Nov. 26, 1991

[54] PASSENGER NUMBER SENSOR SYSTEM

[75] Inventors: Haruo Ishikawa, Kawasaki; Kiyoshi Kawana, Tokyo; Ko Honma, Yokohama; Takashi Yoshikawa, Kawasaki, all of Japan

[73] Assignee: Matsushita Electric Industrial Co., Ltd., Osaka, Japan

[21] Appl. No.: 669,374

[22] Filed: Mar. 14, 1991

[30] Foreign Application Priority Data

Mar. 19, 1990 [JP] Japan .................................. 2-068811

[51] Int. Cl.⁵ .......................... G01V 9/04; G08B 13/18
[52] U.S. Cl. ..................................... 250/342; 340/567
[58] Field of Search ...................... 250/342, 340, 338.1; 340/567

[56] References Cited

U.S. PATENT DOCUMENTS 4,849,737  7/1989  Kirihata et al. ...................... 250/342
4,993,049  2/1991  Cupps ................................. 250/342

FOREIGN PATENT DOCUMENTS 0020477  1/1989  Japan ................................. 250/342

Primary Examiner—Edward P. Westin
Assistant Examiner—Richard Hanig
Attorney, Agent, or Firm—Stevens, Davis, Miller & Mosher

[57] ABSTRACT

A passenger-number sensor system wherein a plurality of infrared ray sensors are disposed on a straight line to detect temperature changes in their light reception zones, a plurality of optical lenses are provided one for each of the plurality of infrared ray sensors, and a counter is provided to select one of the addition values in a predetermined range according to a sense pattern based on the temperature changes of the infrared ray sensors and add the selected addition value to a so-far accumulated count value.

1 Claim, 2 Drawing Sheets

PASSENGER NUMBER SENSOR SYSTEM

BACKGROUND OF THE INVENTION

The present invention relates to a passenger number sensor system which measures the number of passengers passing through a wide door of a bus or the like vehicle even when a plurality of passengers may pass through the wide door at the same time.

In these days, a passenger number sensor system has been widely used as a suitable means for measuring the number of passengers when a person who counts the number of passenger passing through a desired door or gate cannot visually see the door or gate directly or when it is difficult to manually count the passenger number because of too many passengers.

A prior art passenger number sensor system will be detailed with reference to the attached drawing.

Referring to FIG. 3, there is shown a block diagram of a schematic arrangement of a prior art passenger number sensor system.

In FIG. 3, a differential infrared-ray sensor 1, which detects a change in the temperature of a light reception zone and generates a pulse signal corresponding thereto, is usually disposed in the upper part of a place for measurement of the number of passengers passing therethrough. A counter 2 counts up + "1" whenever receiving a pulse signal from the infrared ray sensor 1. Reference number 3 denotes a passenger who is passing through the passenger-number measurement place.

Explanation will next be made as to the operation of the above prior art passenger-number sensor system. When the passenger 3 passes through the passenger-number measurement place, the infrared ray sensor 1 senses a temperature change caused by the absorption of infrared rays issued from the infrared ray sensor 1 by the passenger 3 and sends a pulse signal to the counter 2. The counter 2, whenever receiving the pulse signal from the sensor 1, recognizes the passage of the passenger 3 and counts up + "1" to accumulatively measure the number of passengers passing through the measurement place.

As has been explained above, the prior art passenger-number sensor system can measure the number of passengers passing through the measurement place, under the condition that the passenger 3 can pass only one at a time through the measurement place where the infrared ray sensor 1 is installed.

However, the above prior art passenger-number sensor system has had such a problem that, since the counter 2 counts up + "1" constantly for measurement of the number of passengers, for example, even in the case where the system is used for such a wide door of a bus that allows a plurality of the passengers 3 to pass through the wide door laterally side by side at a time, the system may sense the passage of the plurality of the passengers 3 as a single temperature change and erronesouly judge it as the passage of the single person, whereby it is impossible to measure the accurate number of such passengers.

SUMMARY OF THE INVENTION

It is therefore an object of the present invention to provide a passenger-number sensor system which can solve the above problem in the prior art and can accurately measure the number of passengers passing through such a wide place that allows passage of a plurality of passengers at a time.

In accordance with the present invention, the above object is attained by providing a passenger-number sensor system which comprises a plurality of infrared ray sensors disposed on a straight line for detecting temperature changes in their light reception zones, a plurality of optical lenses disposed one for each of the plurality of infrared ray sensors for determining the light reception zones of the infrared ray sensors, and means for selecting one of the addition values 1 to n according to a sense pattern based on the temperature changes of the infrared ray sensors.

With such an arrangement of the present invention, even when a plurality of passengers pass through the passenger-number measurement place at a time, corresponding one of the addition values 1 to n is selected according to a sense pattern of the infrared ray sensors and added to a count value so far accumulatively added. As a result, even when the number of passengers passing through a passenger-number measurement place is one or plural, the passenger number can be accurately measured.

DESCRIPTION OF THE PREFERRED EMBODIMENT

An embodiment of the present invention will be explained with reference to the accompanying drawings.

Figure 1:
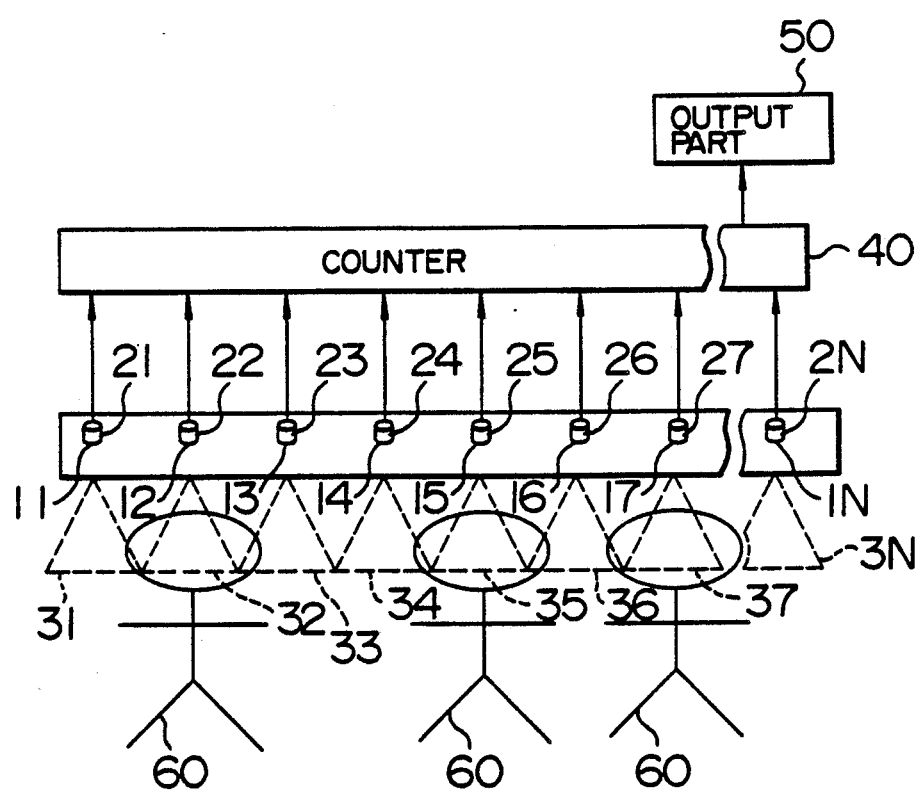
FIG. 1 is a block diagram of an arrangement of a passenger-number sensor system in accordance with an embodiment of the present invention.

Referring to FIG. 1, there is shown a block diagram showing an arrangement of a passenger-number sensor system in accordance with an embodiment of the present invention.

In FIG. 1, differential infrared ray sensors (which will be referred to merely as the infrared ray sensors, hereinafter) 11, 12, . . . , and 1N detect temperature changes in their light reception zones and generate pulse signals which respectively comprise a high-level temperature-change sense signal and a low-level temperature-change non-sense signal.

These infrared ray sensors 11, 12, . . . , and 1N are disposed in the upper part of a passenger-number measurement place so that the sensors are arranged on a straight line substantially perpendicular to the moving direction (in a direction normal to the paper plane of FIG. 1) of passengers passing through the measurement place and so that spacings between the adjacent infrared ray sensors 11 and 12, 12 and 13, . . . , and 1(N-1) and 1N are equal to the respective diameters of their light reception zones to be explained later.

Optical lenses 21, 22, . . . , and 2N, which determine the respective diameters of the light reception zones of the infrared ray sensors 11, 12, . . . , and 1N to be about 1/3 of the width of an ordinary person having an average physical body constitution, are disposed one for each of the infrared ray sensors 11, 12, . . . , and 1N.

The light reception zones of the infrared ray sensors 11, 12, . . . , and 1N have respective diameter parts or maximum widths 31, 32, . . . , and 3N which are determined by the optical lenses 21, 22, ..., and 2N and which collectively form a continuous temperature-change sense band.

A counter 40, which is provided with an addition-value selection table (not shown) for selection of addition values indicative of the number of passengers on the basis of input patterns of pulse signals received from the respective infrared ray sensors 11, 12, ..., and 1N, is provided as a means for accumulating the addition values selected from the addition-value selection table. Reference numeral 50 denotes an output part for outputting a passenger-counted result and 60 denote passengers passing through the passenger-number measurement place.

Figure 2:
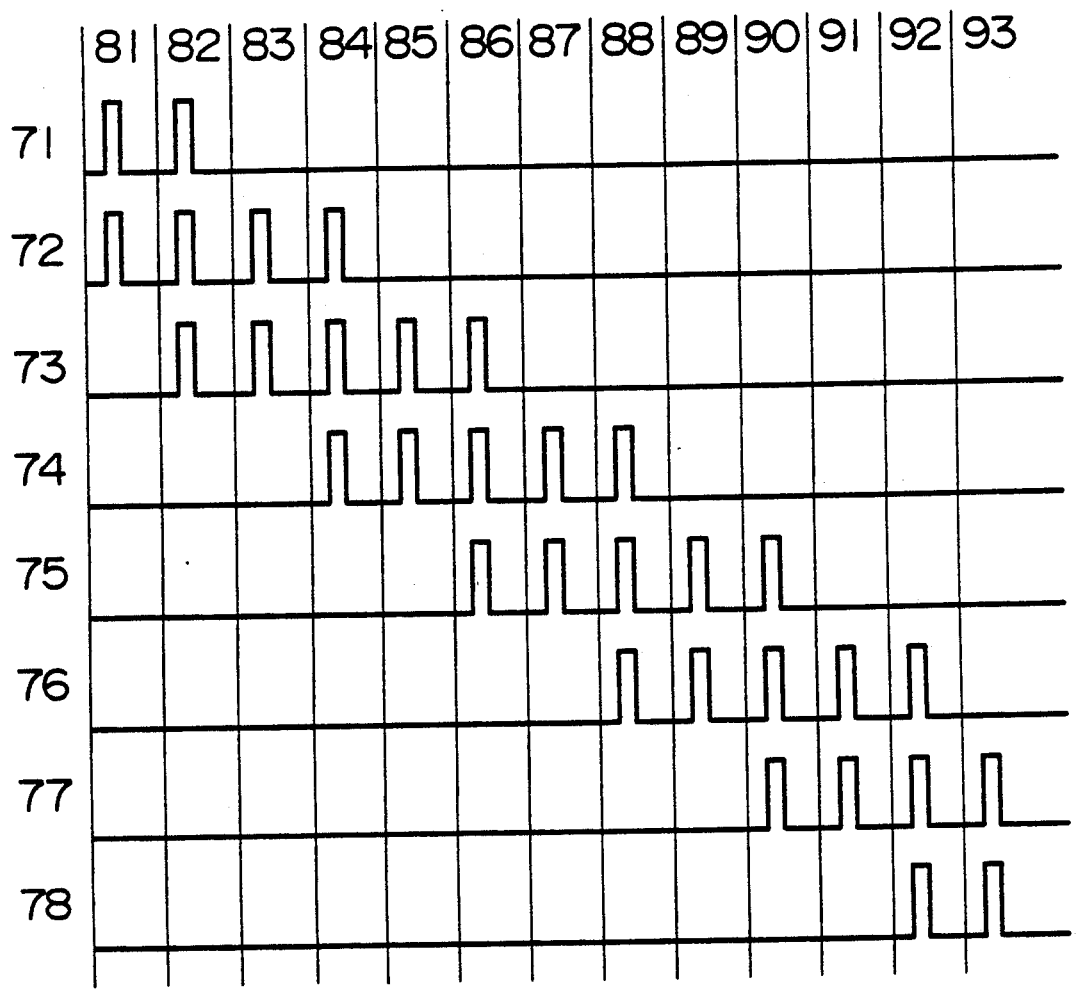
FIG. 2 is a diagram for explaining patterns of pulse signals applied to a counter when a single passenger passes through a measurement place.
Figure 3:
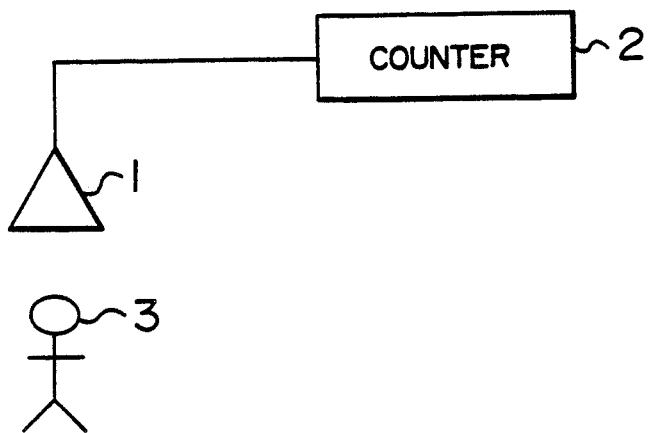
FIG. 3 is a block diagram of a schematic arrangement of a prior art passenger-number sensor system.

FIG. 2 is a diagram for explaining input patterns of pulse signals applied from the 8 infrared ray sensors 11, 12, ..., and 18 (when N is 8 in the illustrated embodiment) to the counter 40 in the case where the single passenger 60 passes through the passenger-number measurement place.

In FIG. 2, more specifically, reference numerals 71, 72, ..., and 78 denote pulse signals generated from the infrared ray sensors 11, 12, ..., and 18; while 81, 82, ..., and 93 denote basic signal patterns of pulse signals applied from the infrared ray sensors 11, 12, ..., and 18 to the counter 40 when the addition value is set at "1".

As already mentioned earlier, the pulse signals 71, 72, ..., and 78 comprises respectively a high-level temperature-change sense signal and a low-level temperature-change non-sense signal. The basic signal patterns 81, 82, ..., and 93 respectively indicate that the infrared ray sensors 11, 12, ..., and 18 detect, at a time, a temperature change caused by the passage of the single passenger 60 through the passenger-number measurement place.

The operation of the foregoing embodiment will next be explained. When the passengers 60 pass through the passenger-number measurement place having the continuous temperature-change sense band formed therein, the infrared ray sensors 11, 12, ..., and 18 having the light reception zones 31, 32, ..., and 3N detect the passage positions of the passengers 60 in the form of temperature changes in the corresponding zones, and send to the counter 40 pulse signals which comprise the high-level temperature-change sense signals issued from ones of the sensors 11, 12, ..., and 18 having detected the temperature changes and the low-level temperature-change non-sense signals issued from the other ones of the sensors 11, 12, ..., and 18 having not detected the temperature changes.

For example, when the single passenger 60 passes through the passenger-number measurement place, a temperature change caused by the passenger 60 is sensed by two or three continuously adjacent ones of the infrared ray sensors 11, 12, ..., and 1N, because each of the light reception zones 31, 32, ..., and 3N of the infrared ray sensors 11, 12, ..., and 1N is set to have a diameter corresponding to about ⅓ of the width of the physical body constitution of an ordinary person.

In this case, the sense patterns of the infrared sensors 11, 12, ..., and 1N vary depending on the passage position of the passenger 60, and thus the pulse signals can have such patterns 81, 82, ..., and 93 as shown in FIG. 2 in the passenger-number measurement place having the 8 infrared ray sensors 11, 12, ..., and 18 disposed therein.

The counter 40, when receiving a pulse signal based on any of the 13 patterns 81, 82, ..., and 93, searches an input pattern corresponding to the received pulse signal in the addition-value selection table, selects an addition value "1", and adds the value "1" to the so-far accumulatively added count value.

Meanwhile, in the event where a plurality of the passengers 60 pass through the passenger-number measurement place, the pattern based on a temperature change caused by each of the passengers 60 is the same as that when the single passenger 60 passes through the same measurement place. Therefore, when the two passengers 60 and 60 pass through the measurement place at a time for example, the pulse signal input pattern at the passenger-number measurement place having the 8 infrared ray sensors 11, 12, ..., and 18 arranged therein corresponds to a combination of any two of the patterns 81, 82, ..., and 93.

The counter 40, when receiving the pulse signal indicative of the above combined pattern, compares the received pulse signal with the basic signal patterns 81, 82, ..., and 93, detects that the receives pulse signal corresponds to a combination of any two of the basic signal patterns 81, 82, ..., and 93, selected an addition value "2", and adds the addition value "2" to the so-far added and accumulated value.

In this way, even when a plurality of the passengers 60 pass through the passenger-number measurement place at a time, the input pattern of the pulse signals received from the infrared ray sensors 11, 12, ..., and 1N is searched in the addition-value selection table, corresponding one of the addition values 2 to n corresponding to the different numbers of passengers passing through the passenger-number measurement place is selected on the basis of the searched pattern, and the selected addition value is added to the so-far accumulatively added count value to measure the number of passengers passing through the measurement place. The added count value of the counter 40 is sent via the output part 50 to a display means, for example, including a liquid crystal and a light emitting diode.

In accordance with the present invention, as has been disclosed in the foregoing, there is provided a passenger-number sensor system which comprises a plurality of infrared ray sensors disposed on a straight line for detecting temperature changes in their light reception zones, a plurality of optical lenses disposed one for each of the plurality of infrared ray sensors for determining the light reception zones of the infrared ray sensors, and means for selecting one of addition values 1 to n according to a sense pattern based on the temperature changes of the infrared ray sensors. As a result, even when a plurality of passengers pass through the passenger-number measurement place at a time, any one of the additions 1 to n is selected on the basis of a sense pattern of the infrared ray sensors and accumulatively added to the so-far accumulated count value. Thus, even when the number of passengers passing through the passenger-number measurement place at a time is one or plural, such passenger number can be accurately measured.

What is claimed is:

1. A passenger-number sensor system comprising:
  a plurality of infrared ray sensors disposed on a straight line for detecting temperature changes in their light reception zones;
  a plurality of optical lenses disposed one for each of said plurality of infrared ray sensors for determining said light reception zones of the infrared ray sensors; and
  means for selecting one of the addition values 1 to n according to a sense pattern based on the temperature changes of the infrared ray sensors.

* * * * *